US012579102B2

(12) United States Patent
Luo et al.

(10) Patent No.: US 12,579,102 B2
(45) Date of Patent: Mar. 17, 2026

(54) FILE ACCESS METHOD, STORAGE NODE, AND NETWORK INTERFACE CARD

(71) Applicant: Huawei Technologies Co., Ltd., Shenzhen (CN)

(72) Inventors: Xianqiang Luo, Chengdu (CN); Zhaojiao Han, Shenzhen (CN); Chu Li, Zürich (CH); Feng Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/331,274

(22) Filed: Jun. 8, 2023

(65) Prior Publication Data

US 2023/0315683 A1 Oct. 5, 2023

Related U.S. Application Data

(63) Continuation of application No. PCT/CN2021/115931, filed on Sep. 1, 2021.

(30) Foreign Application Priority Data

Dec. 8, 2020 (CN) .......................... 202011444954.3
Feb. 27, 2021 (CN) .......................... 202110221660.2

(51) Int. Cl.
*G06F 16/13* (2019.01)
*G06F 16/182* (2019.01)

(52) U.S. Cl.
CPC ............ *G06F 16/13* (2019.01); *G06F 16/183* (2019.01)

(58) Field of Classification Search
None
See application file for complete search history.

(56) References Cited

U.S. PATENT DOCUMENTS 9,977,760 B1 * 5/2018 Diehl ...................... G06F 16/13
2007/0050591 A1 * 3/2007 Boyd ...................... G06F 9/461
711/171

(Continued)

FOREIGN PATENT DOCUMENTS

CN 105450588 A 3/2016
CN 109634876 A 4/2019

(Continued)

OTHER PUBLICATIONS

Sheldon, Robert; and Alan Miller, James. "What Is Remote Direct Memory Access (RDMA) Networking and How Does It Work?" Published Nov. 2021 by TechTarget.com. Accessed Aug. 19, 2024 from https://www.techtarget.com/searchstorage/definition/Remote-Direct-Memory-Access (Year: 2021).*

(Continued)

*Primary Examiner* — Umar Mian
(74) *Attorney, Agent, or Firm* — Conley Rose, P.C.

(57) ABSTRACT

A file access method includes that a second device may initiate a file access request to a first device, where the file access request includes a file identifier of a file. After receiving the file access request, a network interface card of the first device may directly parse the file access request to obtain the file identifier carried in the file access request, then access the file in a memory of the first device based on the file identifier, and send a file access response to the second device. When the first device receives the file access request, the network interface card of the first device may process the file access request without intervention of a processor of the first device.

20 Claims, 10 Drawing Sheets

(56)                    References Cited

U.S. PATENT DOCUMENTS

| 2007/0162619 | A1* | 7/2007 | Aloni | ..................... | H04L 49/90 |
| | | | | | 709/250 |
| 2009/0276476 | A1* | 11/2009 | Jolly | ........................ | G06F 16/10 |
| 2016/0080488 | A1* | 3/2016 | Battepati | ................ | H04L 67/06 |
| | | | | | 709/217 |
| 2017/0034268 | A1* | 2/2017 | Govind | .............. | H04L 67/1008 |
| 2019/0012282 | A1* | 1/2019 | Wakuda | .................. | G06F 13/28 |

FOREIGN PATENT DOCUMENTS

| CN | 110647480 A | 1/2020 |
| CN | 110764688 A | 2/2020 |

OTHER PUBLICATIONS

Samuel A. Fineberg et al: "Performance Measurements of a User-Space DAFS Server with a Database Workload," Aug. 2003, total 11 pages.

* cited by examiner

| File identifier | Index address | Index size (index size) | File information address | Log key (log mkey) | Log address | Log size (log size) | Log offset |
|---|---|---|---|---|---|---|---|
| 0x0011223 | ... | ... | ... | ... | ... | ... | ... |
| 0x0011225 | ... | ... | ... | ... | ... | ... | ... |
| 0x2233446 | ... | ... | ... | ... | ... | ... | ... |
| ... | ... | ... | ... | ... | ... | ... | ... |

| Data packet header | |
| --- | --- |
| Zeroth to third bytes | OP and offset (offset) |
| Fourth to seventh bytes | Page index (page index) |
| Eighth to eleventh bytes | File identifier |
| Twelfth to fifteenth bytes | Data length (length) |

1

FILE ACCESS METHOD, STORAGE NODE, AND NETWORK INTERFACE CARD

CROSS-REFERENCE TO RELATED APPLICATIONS

This is a continuation of International Patent Application No. PCT/CN2021/115931 filed on Sep. 1, 2021, which claims priority to Chinese Patent Application No. 202110221660.2 filed on Feb. 27, 2021 and Chinese Patent Application No. 202011444954.3 filed on Dec. 8, 2020. All of the aforementioned patent applications are hereby incorporated by reference in their entireties.

TECHNICAL FIELD

This application relates to the field of storage technologies, and in particular, to a file access method, a storage node, and a network interface card.

BACKGROUND

Currently, multiple interactions need to be performed to implement file read and write between a client and a server. For example, when data is transmitted between the client and the server according to the remote direct memory access (RDMA) protocol, if the client needs to read a file stored in the server, the client needs to first initiate a file index obtaining request to read a file index from the server. After obtaining the file index, the client initiates a file read request to the server by using the file index to obtain the file from the server.

If the client needs to store a file to the server, multiple types of information, such as data in the file, a file log, and a file index, about the file need to be stored. However, only one type of information is stored through one one-sided RDMA operation. Therefore, multiple interactions need to be performed between the client and the server to respectively store the multiple types of information about the file to the server.

It can be learned from the foregoing that multiple interactions need to be performed between the client and the server for both the file read and the file write. This is inefficient and time-consuming.

SUMMARY

This application provides a file access method, a storage node, and a network interface card, to improve file access efficiency.

According to a first aspect, an embodiment of this application provides a file access method. A second device (which may serve as a client) may initiate a file access request to a first device (which may serve as a server), where the file access request requests to access a file stored in the first device. The file access request may request to read first data in the file (in other words, the file access request is a file read request), or may request to write second data into the file (in other words, the file access request is a file write request). The file access request includes a file identifier of the file. The file identifier may be allocated by the first device (for example, a network interface card or a processor of the first device) to the file and notified to the second device in advance.

When the file access request arrives at the first device, the network interface card of the first device first receives the file access request. The network interface card of the first device may directly parse the file access request to obtain the file identifier carried in the file access request, access the file in a memory of the first device based on the file identifier, and send a file access response to the second device.

According to the foregoing method, when the second device needs to access the file in the first device, the network interface card of the first device may directly process the file access request without intervention of the processor of the first device. This can improve file access efficiency. In addition, the first device and the second device need to interact only once (to be specific, the second device sends the file access request, and the first device feeds back the file access response), to implement file access. This reduces a quantity of interactions between the devices, and ensures file access efficiency.

In a possible implementation, before receiving the file access request from the second device, the network interface card of the first device may first send the file identifier to the second device.

For example, when the second device initiates a file open request to the first device, the processor of the first device may open the file based on the file open request, and may notify a storage area of the file in the memory of the first device to the network interface card of the first device. After obtaining the storage area of the file from the processor of the first device, the network interface card of the first device performs a memory registration operation for the storage area of the file, and allocates the file identifier to the file. Then, the network interface card of the first device may send the file identifier to the second device.

The foregoing descriptions use an example in a file open scenario in which the network interface card of the first device obtains the storage area of the file from the processor of the first device and the file identifier is allocated by the network interface card. Actually, embodiments of this application are not limited to a scenario in which the network interface card of the first device obtains the storage area of the file from the processor of the first device. Alternatively, the file identifier may be allocated by the processor of the first device to the file, and notified to the network interface card of the first device.

According to the foregoing method, the network interface card of the first device may obtain the storage area of the file from the processor of the first device such that the network interface card of the first device can determine a storage location of the file, and may perform an operation on, for example, read data from or write data into, the storage area of the file after performing memory registration. This provides a possibility of subsequently accessing the file by the network interface card of the first device.

In a possible implementation, the file includes not only data in the file but also related information, such as a file index, file information, and a file log, of the file. The storage area of the file may store the data in the file and the related information of the file. To be specific, the storage area of the file may include at least one of the following: a data storage area (storing the data in the file) of the file, an index storage area (storing the file index) of the file, an information storage area (storing the file information) of the file, and a log storage area (storing the file log) of the file.

According to the foregoing method, the storage area of the file may include the areas that store the data in the file and the related information of the file such that the network interface card of the first device can access the data in the file and the related information of the file.

In a possible implementation, when the file access request requests to read the first data in the file, the network interface card of the first device may determine the file index of the file based on the file identifier, then obtain the first data based on the file index, and send the file access response to the second device, where the file access response includes the first data.

According to the foregoing method, the network interface card of the first device may read the first data from the file based on the file identifier without participation of the processor or multiple interactions with the second device. This ensures file read efficiency.

In a possible implementation, when determining the file index of the file based on the file identifier, the network interface card of the first device may first determine the index storage area of the file based on the file identifier, and read the file index from the index storage area of the file.

According to the foregoing method, because the network interface card of the first device obtains the storage area of the file index from the processor of the first device in advance, the network interface card of the first device can obtain the file index from the index storage area of the file. Therefore, the file index is obtained in a simpler and more convenient manner.

In a possible implementation, the file index may indicate a location that is of the data in the file and that is in the data storage area of the file. After obtaining the file index, the network interface card of the first device may learn of the location that is of the data in the file and that is in the data storage area of the file, and therefore can obtain the first data in the file from the data storage area of the file.

According to the foregoing method, the network interface card of the first device can parse the file index to determine the location that is of the data in the file and that is in the data storage area of the file. Because the network interface card of the first device obtains the storage area of the file from the processor of the first device in advance, and performs the memory registration operation, the network interface card of the first device can read the first data from the data storage area of the file. This data read process needs to be executed only by the network interface card of the first device. This ensures the file read efficiency.

In a possible implementation, when the file access request requests to write the second data into the file, the file access request includes the second data. The network interface card of the first device may write the second data into the file based on the file access request. After writing the second data, the network interface card of the first device may send the file access response to the second device, where the file access response indicates that the second data is successfully written.

According to the foregoing method, the network interface card of the first device may write the second data into the file based on the file access request without participation of the processor or multiple interactions with the second device. This ensures file write efficiency.

In a possible implementation, if writing the second data into the file causes a change of a location that is of the data in the file and that is in the data storage area of the file, the network interface card of the first device may determine the file index based on the file identifier, and update the file index. An updated file index may indicate a storage location of data in the file into which the second data is written, in other words, the updated file index may indicate a storage location of the second data.

According to the foregoing method, the updated file index can accurately indicate the storage location that is of the data in the file into which the second data is written and that is in the data storage area of the file.

4

In a possible implementation, there are a plurality of manners in which the file access request requests to write the second data into the file. The following separately describes the manners.

Manner 1: The file access request requests to append the second data to the file. In other words, a write mode is append.

When writing the second data into the file, the network interface card of the first device first applies for a first storage area, and writes the second data into the first storage area, where the first storage area is in the data storage area of the file, and a start location (a start virtual address) of the first storage area points to an end of the file, in other words, the written second data should be next to the data already stored in the file.

Manner 2: The file access request requests to replace data in the file with the second data, and retain the original data. In other words, a write mode is rewrite.

When writing the second data into the file, the network interface card of the first device may first apply for a second storage area, and then write the second data into the second storage area. The second storage area is in the data storage area of the file.

Manner 3: The file access request requests to replace data in the file with the second data. In other words, a write mode is replace.

The file access request further includes a data length of the second data and an offset of the second data in the data in the file. When writing the second data into the file, the network interface card of the first device may determine, from the data storage area of the file based on the data length of the second data and the offset of the second data in the data in the file, data that needs to be replaced, and overwrite, with the second data, the data that needs to be replaced.

According to the foregoing method, the network interface card of the first device can implement data write in different manners, and is applicable to different application scenarios.

In a possible implementation, when determining the file index based on the file identifier, and updating the file index, the network interface card of the first device may determine the index storage area of the file based on the file identifier, then read the file index from the index storage area of the file, and update the file index.

According to the foregoing method, the network interface card of the first device can conveniently obtain and update the file index. This ensures that the file index can accurately indicate the storage location that is of the data in the file and that is in the data storage area of the file.

According to a second aspect, an embodiment of this application provides a file registration method. The method is applied to a first device that stores a file. In the method, a second device may send a file open request to the first device, where the file open request requests to open the file. The file open request is first received by a network interface card of the first device when arriving at the first device, and then the network interface card of the first device sends the file open request to a processor of the first device.

After receiving the file open request, the processor of the first device may open the file based on the file open request, further determine a storage area of the file in a memory of the first device, and notify the storage area of the file to the network interface card of the first device. Then, the network interface card of the first device may send a file open response to the second device, where the file open response indicates that the file is successfully opened, and includes a file identifier of the file. The file identifier is allocated by the network interface card of the first device to the file (where for example, after the processor of the first device notifies the storage area of the file to the network interface card of the first device, the network interface card of the first device may perform a memory registration operation for the storage area of the file, and may further allocate the file identifier to the file), or may be allocated by the processor of the first device to the file (where the processor of the first device may notify the file identifier to the network interface card of the first device).

According to the foregoing method, the processor of the first device may notify the storage area of the file to the network interface card of the first device, to ensure that the network interface card of the first device can learn of the storage area of the file such that the network interface card of the first device can subsequently access the file.

In a possible implementation, if the file is not stored in the memory of the first device, the processor of the first device may allocate the storage area to the file when determining the storage area of the file.

According to the foregoing method, the processor of the first device can allocate the storage area to the file such that the file can be stored in the memory of the first device, to help the network interface card of the first device subsequently access the file.

In a possible implementation, the storage area of the file includes at least one of the following: a data storage area of the file, an index storage area of the file, an information storage area of the file, and a log storage area of the file.

According to the foregoing method, the storage area of the file may include the areas that store data in the file and related information of the file, to ensure that the network interface card of the first device can access the data in the file and the related information of the file.

According to a third aspect, an embodiment of this application provides a storage node. The storage node can implement both a file registration manner and a file access manner. For specific beneficial effects, refer to the descriptions of the first aspect and the second aspect. Details are not described herein again. The storage node includes a network interface card and a memory.

The network interface card is configured to receive a file access request from a client, where the file access request requests to access a file, and includes a file identifier of the file; and access the file in the memory of the storage node based on the file identifier, and send a file access response to the client.

The memory is configured to store the file. The memory may be a volatile memory, for example, a random-access memory (RAM), a dynamic RAM (DRAM), or a combination thereof; may be a non-volatile memory, for example, a storage class memory (SCM); or may be a combination of the volatile memory and the non-volatile memory.

In a possible implementation, the storage node further includes a processor.

The processor may determine a storage area of the file in the memory, and notify the storage area of the file to the network interface card. For example, when the processor receives a file open request from the client, the processor may open the file based on the file open request, further determine the storage area of the file in the memory, and notify the storage area of the file to the network interface card.

The network interface card may obtain the storage area of the file from the processor, perform a memory registration operation for the storage area of the file, allocate the file identifier to the file, and send the file identifier to the client.

For example, the network interface card may send a file open response to the client, where the file open response includes the file identifier.

In a possible implementation, if the file is not stored in the memory, the processor may allocate the storage area to the file when determining the storage area of the file.

In a possible implementation, the storage area of the file includes at least one of the following: a data storage area of the file, an index storage area of the file, an information storage area of the file, and a log storage area of the file.

In a possible implementation, the network interface card may further access the file. Further, the network interface card may receive the file access request from the client, where the file access request requests to access the file, and includes the file identifier. Then, the network interface card may access the file based on the file identifier, and send file access response to the client.

In a possible implementation, the file access request may be a file read request, and requests to read first data in the file. When accessing the file and sending the file access response to the client, the network interface card may determine a file index of the file based on the file identifier. Then, the network interface card obtains the first data based on the file index, and sends the file access response to the client, where the file access response includes the first data.

In a possible implementation, when determining the file index of the file based on the file identifier, the network interface card may first determine the index storage area of the file based on the file identifier, and then read the file index from the index storage area of the file.

In a possible implementation, the file index indicates a location that is of data in the file and that is in the data storage area of the file. The network interface card may determine the location that is of the data in the file and that is in the data storage area of the file based on the file index, and read the first data from the data storage area of the file.

In a possible implementation, the file access request is a file write request, and requests to write second data into the file. The file access request includes the second data. When accessing the file based on the file identifier and sending the file access response to the client, the network interface card may write the second data into the file, and send the file access response to the client, where the file access response indicates that the second data is successfully written.

In a possible implementation, the network interface card may further determine a file index of the file based on the file identifier, and update the file index, where an updated file index indicates a storage location of the second data.

In a possible implementation, there are a plurality of manners in which the file access request requests to write the second data into the file. The following separately describes the manners.

Manner 1: The file access request requests to append the second data to the file.

When writing the second data into the file, the network interface card may first apply for a first storage area, and write the second data into the first storage area. The first storage area is in the data storage area of the file, and a start location of the first storage area points to an end of the file.

Manner 2: The file access request requests to replace data in the file with the second data, and retain the original data.

When writing the second data into the file, the network interface card may apply for a second storage area, and write the second data into the second storage area. The second storage area is in the data storage area of the file.

Manner 3: The file access request requests to replace data in the file with the second data.

The file access request further includes a data length of the second data and an offset of the second data in data in the file. When writing the second data into the file, the network interface card may determine, from the data storage area of the file based on the data length of the second data and the offset of the second data in the data in the file, data that needs to be replaced, and overwrite, with the second data, the data that needs to be replaced.

In a possible implementation, when determining the file index based on the file identifier, and updating the file index, the network interface card may determine the index storage area of the file based on the file identifier, then read the file index from the index storage area of the file, and update the file index.

According to a fourth aspect, an embodiment of this application further provides a file access apparatus. The file access apparatus is deployed on a network interface card, and has a function of implementing behavior in the method example of the first aspect. For beneficial effects, refer to the descriptions of the first aspect. Details are not described herein again. The function may be implemented by hardware, or may be implemented by hardware executing corresponding software. The hardware or the software includes one or more units corresponding to the foregoing functions. In a possible design, a structure of the apparatus includes a receiving unit, a processing unit, and a sending unit. These units may perform corresponding functions of the network interface card in the method example of the first aspect. For details, refer to the detailed descriptions in the method example. Details are not described herein again.

According to a fifth aspect, an embodiment of this application further provides a file registration apparatus. The file registration apparatus is deployed on a processor, and has a function of implementing behavior in the method example of the second aspect. For beneficial effects, refer to the descriptions of the second aspect. Details are not described herein again. The function may be implemented by hardware, or may be implemented by hardware executing corresponding software. The hardware or the software includes one or more units corresponding to the foregoing functions. In a possible design, a structure of the apparatus includes a receiving unit, a processing unit, and a sending unit. These units may perform corresponding functions of the processor in the method example of the second aspect. For details, refer to the detailed descriptions in the method example. Details are not described herein again.

According to a sixth aspect, an embodiment of this application further provides a network interface card. The network interface card has a function of implementing behavior in the method example of the first aspect. For beneficial effects, refer to the descriptions of the first aspect. Details are not described herein again.

In a possible implementation, a structure of the network interface card may include a processor and a memory. The processor is configured to support the network interface card in performing a corresponding function of the network interface card in the method of the first aspect or the second aspect. The memory is coupled to the processor, and stores program instructions and data that are necessary for the network interface card. The network interface card may further include an interface, configured to communicate with another device, for example, receive a file access request and send a file access response.

In another possible implementation, a structure of the network interface card may alternatively include a processor and an interface. The processor is configured to support the network interface card in performing a corresponding function in the method of the first aspect. The processor may further transmit data through the interface, for example, receive a file access request and send a file access response.

According to a seventh aspect, this application further provides a computer-readable storage medium. The computer-readable storage medium stores instructions. When the instructions are run on a computer, the computer is enabled to perform the method according to the first aspect and the possible implementations of the first aspect. Alternatively, when the instructions are run on a computer, the computer is enabled to perform the method according to the second aspect and the possible implementations of the second aspect.

According to an eighth aspect, this application further provides a computer program product including instructions. When the computer program product runs on a computer, the computer is enabled to perform the method according to the first aspect and the possible implementations of the first aspect or the method according to the second aspect and the possible implementations of the second aspect.

According to a ninth aspect, this application further provides a computer chip. The chip is connected to a memory, and is configured to read and execute a software program stored in the memory, to perform the method according to the first aspect and the possible implementations of the first aspect or the method according to the second aspect and the possible implementations of the second aspect.

DESCRIPTION OF EMBODIMENTS

Figure 1:
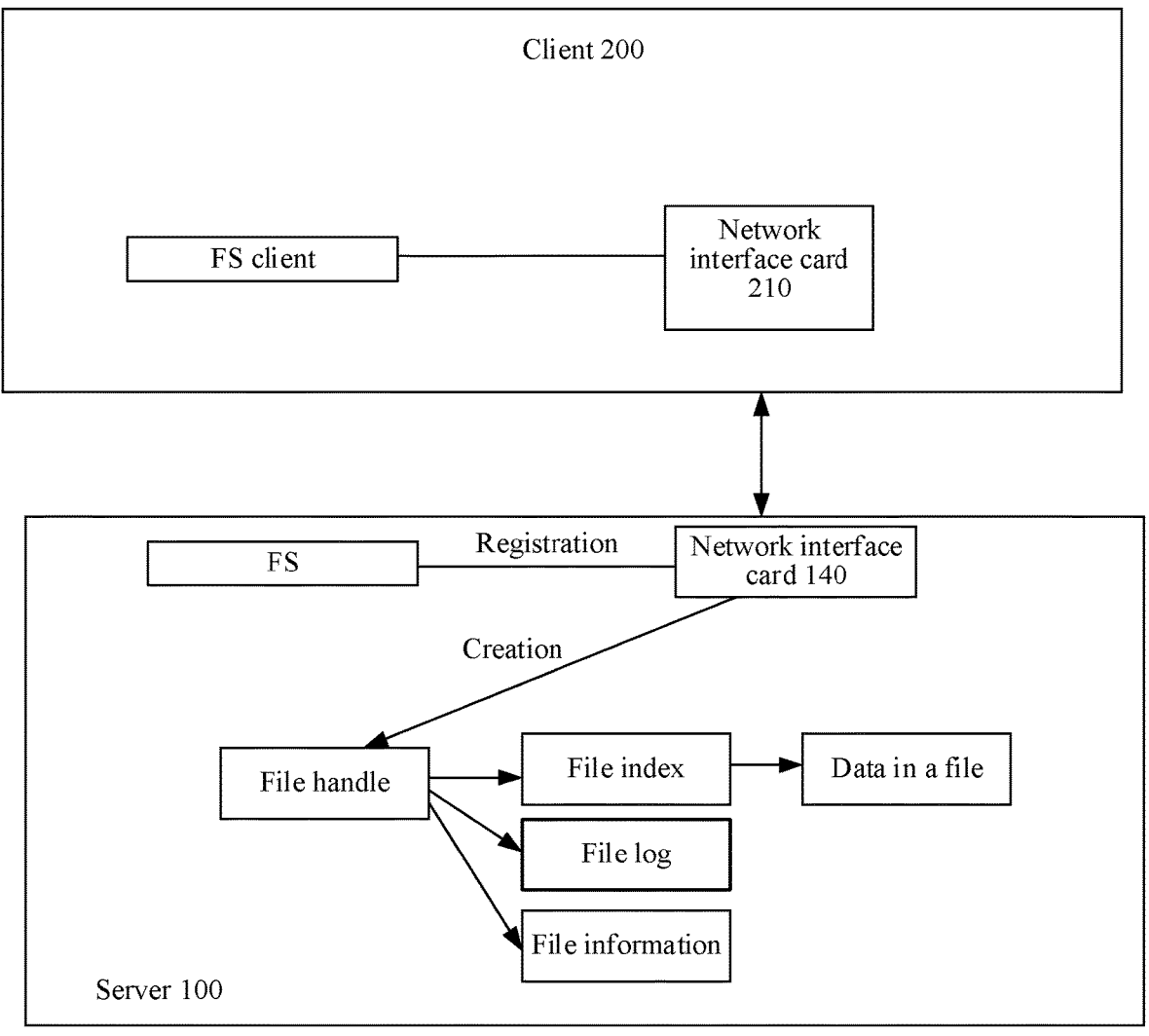
FIG. 1 is a schematic diagram of an architecture of a system according to this application.

Embodiments of this application relate to file read. To facilitate understanding of embodiments of this application, some terms in this application are first described.

1. File

The file is a data presenting form. A specific type of the file is not limited in embodiments of this application. For example, the file may be a video file, a voice file, or a text file. The file may include data of a same type. For example, the data in the file is all voice data or pictures. Alternatively, data in the file may include data of different types. For example, the file may be a communication file transmitted between computing devices, and may include data such as a picture and a text.

The file may be stored in different memories. When the file is stored, both the data in the file and related information of the file need to be stored. The related information of the file describes the file.

The related information of the file includes a part or all of the following: a file index, file information, a file log, and a file identifier.

2. File Identifier

The file identifier uniquely identifies a file. In embodiments of this application, a client (for example, a network interface card of the client) initiates, to a server (a network interface card of the server), a file read request or a file write request that carries the file identifier, to indicate the server to read data from the file or write data into the file. In embodiments of this application, the file identifier is provided by the server for the client (where for example, in a scenario in which the client initiates a file open request to the server, a processor or the network interface card of the server allocates the file identifier to the file, and then the network interface card provides the file identifier for the client).

A type of the file identifier is not limited in embodiments of this application. For example, the file identifier may be a remote key allocated by the network interface card of the server to the file when the network interface card of the server performs memory registration, or may be information, such as a number, allocated by the network interface card or the processor of the server to the file. Any information that can uniquely identify the file is applicable to embodiments of this application.

3. File Index

The file index indicates a storage location that is of data in a file and that is in a memory of a server. In embodiments of this application, the file index may indicate a location that is of the data in the file and that is in a data storage area of the file. The data storage area of the file is in the memory of the server. The file index is parsed to determine the storage location of the data in the file, for example, determine a physical address for storing the data in the file.

4. File Information

The file information is attribute information of a file, and may include a file size and related information describing file access, for example, a time point at which the file is accessed, a size of data accessed in the file, and a data offset.

5. File Log

The file log is information needed for file restoration (for example, restoration of data in a file), and can ensure file storage reliability to some extent. Content recorded in the file log varies with an application scenario.

6. RDMA

The RDMA is a direct memory access method. A computing device can directly read data from or write data into a memory of another computing device through the RDMA without processing by a processor.

7. File Registration

In embodiments of this application, a processor of a server may register a file with a network interface card of the server, to be specific, the processor of the server may notify a storage area of the file to the network interface card of the server. In this way, the network interface card can obtain the storage area of the file. The storage area of the file is a storage area that stores data in the file and related information of the file.

In embodiments of this application, the storage area of the file may include a part or all of the following: an index storage area of the file, an information storage area of the file, a log storage area of the file, and a data storage area of the file.

The index storage area of the file is an area that is in a memory of the server and that stores a file index, the information storage area of the file is an area that is in the memory of the server and that stores file information, the log storage area of the file is an area that is in the memory of the server and that stores a file log, and the data storage area of the file is an area that is in the memory of the server and that stores the data in the file.

It should be noted that, in embodiments of this application, the data storage area of the file is a storage area that stores the data and that is allocated by the processor of the server to the file. The data storage area of the file may include an area that has stored the data and a blank area. The blank area may store, when data is subsequently written into the file, the data that needs to be newly written. The file index indicates a storage location of the data in the current file. After each time of data write into the file, the file index needs to be updated such that an updated file index can indicate a storage location that is of data in the file after the data write.

8. Memory Registration

Data may be directly read from or written into a memory through RDMA. Memory registration is a prerequisite for reading the data from or writing the data into the memory. The memory registration may be understood as obtaining a control right of the memory, to read the data from or write the data into the memory.

The memory registration is a protection measure for the memory in the RDMA. The memory can be operated through the RDMA only when the memory is registered with an RDMA memory region (MR). After the memory registration is completed, the data can be read from or written into the memory.

In embodiments of this application, a processor of a server may register a file with a network interface card of the server (where the network interface card has an RDMA engine), to be specific, the processor of the server may notify a storage area of the file to the network interface card of the server. After the network interface card learns of the storage area of the file, the network interface card may perform a memory registration operation for the storage area of the file, to register the storage area of the file with the RDMA memory region.

After performing the memory registration operation, the network interface card can perform an operation on data in the file, a file index, file information, and a file log, to facilitate subsequent file read or write, for example, data read from the file, data write into the file, and update of the file index, the file information, and the file log.

9. Queues

RDMA supports three queues in total: a send queue (SQ), a receive queue (RQ), and a complete queue (CQ). The SQ and the RQ are usually created in pairs, and are referred to as a queue pair (QP).

RDMA is a message-based transport protocol, and data transmission is an asynchronous operation. An RDMA operation process is as follows:

(1) A processor of a host submits a work request (WR) to a network interface card, and the network interface card configures the work request to work queues (WQs), where the work queues include a SQ and a RQ. Each element in the work queue is referred to as a work queue element (WQE), and one element corresponds to one WR.

(2) The processor of the host may obtain a work complete (WC) from a complete queue (CQ) through the network interface card. Each element in the complete queue is referred to as a complete queue element (CQE), and one element corresponds to one WC.

Hardware, for example, the network interface card, that has an RDMA engine may be considered as a queue element processing module. The hardware continuously obtains the WR from the WQ, executes the work request, and places the WC in the CQ after the execution.

10. RDMA Data Transmission

In embodiments of this application, an RDMA send/receive operation is merely used as an example for description. RDMA is a message-based data transport protocol, and all data packets are assembled on hardware having an RDMA engine.

The RDMA send/receive operation is a two-sided operation, to be specific, awareness and participation of a remote application are required for the send/receive operation.

For example, a host A sends data to a host B (where the host A and the host B are referred to as A and B for short below).

First, A and B both need to create and initialize a QP and a CQ.

A and B respectively add a WQE to their WQs. For A, WQ=SQ, and the WQE points to data that is to be sent. For B, WQ=RQ, and the WQE points to a buffer for storing data.

A network interface card of A asynchronously schedules the WQE that is got by A through polling, learns through parsing that the WQE is a send message, and directly sends B the data pointed to by the WQE. After a data stream arrives at a network interface card of B, the WQE of B is consumed, and the network interface card of B directly stores the data to the cache pointed to by the WQE.

After communication between A and B is complete, a complete message, namely, a CQE, is generated in the CQ of A, and indicates that the sending is complete. A complete message, namely, a CQE, is also generated in the CQ of B, and indicates that the receiving is complete. A CQE is generated after a WQE in each WQ is processed.

FIG. 1 is a schematic diagram of an architecture of a system according to an embodiment of this application. As shown in FIG. 1, the system includes a server 100 and a client 200.

The client 200 is deployed on a user side, and is configured to initiate a request to the server 100 when triggered by a user. A specific form of the client 200 is not limited in embodiments of this application. For example, the client 200 may be a local computing device of the user or a dedicated client.

A file system (FS) client may be deployed on the client 200, and may be software running on the client 200. The user may access, through the FS client configured on the local computing device, a file stored in the server 100, and indicate the server 100 (for example, a network interface card of the server 100) to perform an operation, for example, read or write (where in embodiments of this application, write includes append and overwrite), on the file stored in the server 100.

A network interface card 210 may be further deployed on the client 200. When the user accesses the server 100 through the FS client, the FS client may trigger the network interface card 210 to generate a file access request (for example, a file read request or a file write request), and send the file access request to the server 100 through the network interface card.

In embodiments of this application, the server 100 can store the file of the user. The server 100 is essentially a storage node, and has a file storage function. A deployment location of the server 100 is not limited in embodiments of this application. For example, the server 100 may be deployed in an edge data center, may be deployed in a cloud data center, or may be deployed on a terminal computing device. Alternatively, the server 100 may be deployed in a part or all of environments of the edge data center, the cloud data center, and the terminal computing device in a distributed manner.

A FS runs on the server 100, and may be software running on a processor 120 of the server 100. The file system manages the file stored in the server 100, can allocate a storage area to the file in a memory 130 of the server 100, and may further notify the storage area of the file to a network interface card 140, to be specific, register the file with the network interface card 140, to trigger the network interface card 140 to perform a memory registration operation. After learning of the storage area of the file, the network interface card 140 may perform file read and write. When the network interface card 140 needs to perform file read or write, the network interface card 140 may create a file handle, and implement the file read and write through an operation on the file handle.

In embodiments of this application, the client 200 interacts with the server 100 to implement operations such as the file read and write. When the client 200 interacts with the server 100, an interaction procedure is simplified to reduce a quantity of interactions between the client 200 and the server 100. In embodiments of this application, the network interface card 140 of the server 100 can obtain the storage area of the file from the processor 120 of the server 100, perform the memory registration operation, and allocate a file identifier to the file. On this basis, the network interface card 140 of the server 100 can directly determine the storage area of the file (for example, an index storage area of the file) based on the file identifier. After the client 200 may send, to the server 100, the file access request that carries the file identifier, the server 100 (for example, the network interface card of the server 100) may determine the storage area of the file based on the file identifier carried in the file access request, perform file read or write based on the file access request, and send an access response (for example, a file read response or a file write response) to the client 200 after the file read and the file write.

Further, inside the server 100, the file access operation performed by the server 100 may be performed by the network interface card 140 of the server 100 instead of the processor of the server 100.

Figure 2:
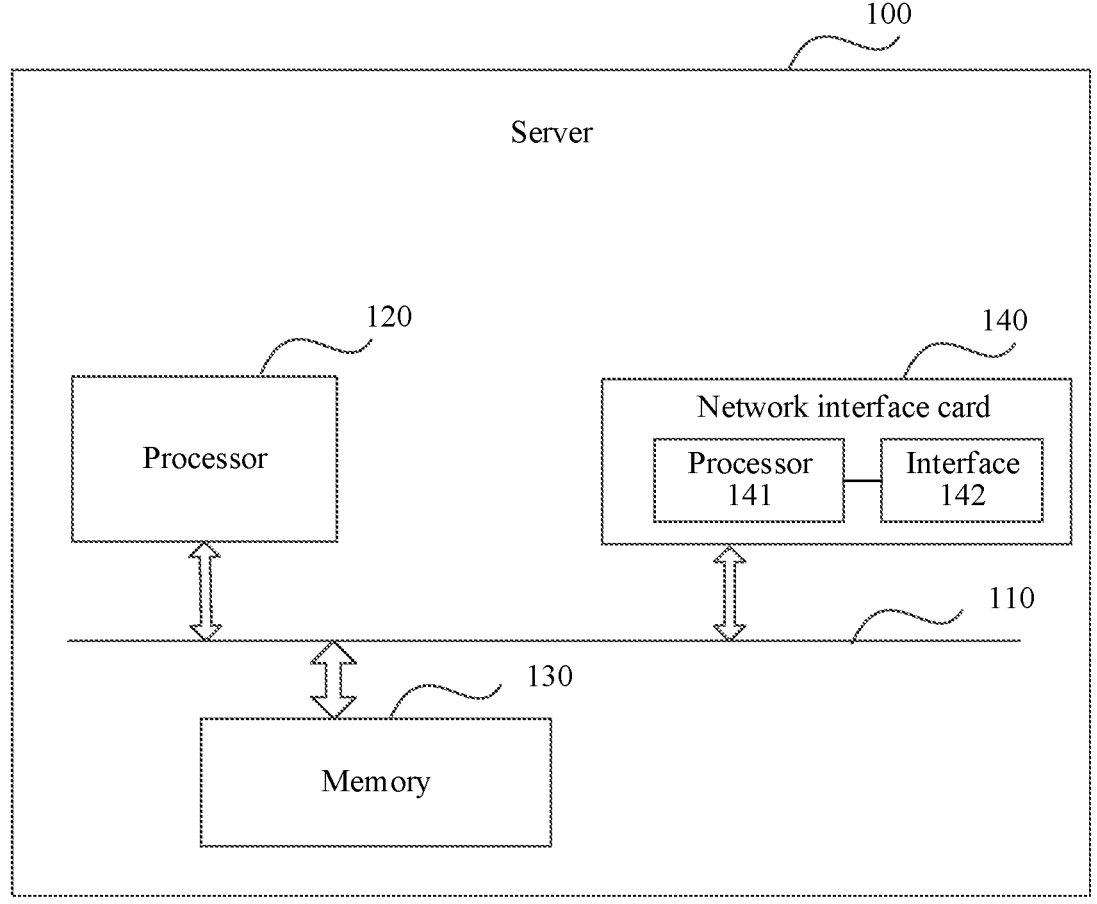
FIG. 2 is a schematic diagram of a structure of a server according to this application.

FIG. 2 is a schematic diagram of a structure of the server 100. The server 100 includes a bus 110, the processor 120, the memory 130, and the network interface card 140. The processor 120, the memory 130, and the network interface card 140 communicate with each other through the bus 110.

The processor 120 may be a central processing unit (CPU), an application-specific integrated circuit (ASIC), a field-programmable gate array (FPGA), an artificial intelligence (AI) chip, a system on a chip (SoC), a complex programmable logic device (CPLD), a graphics processing unit (GPU), or the like.

The memory 130 may include a volatile memory, for example, a RAM or a DRAM. Alternatively, the memory 130 may be a non-volatile memory, for example, an SCM, a combination of the volatile memory and the non-volatile memory, or the like.

The memory 130 may further include another software module, for example, an operating system, necessary for running a process. The operating system may be Linux™ UNIX™ Windows™, or the like.

Figures 3, 4:
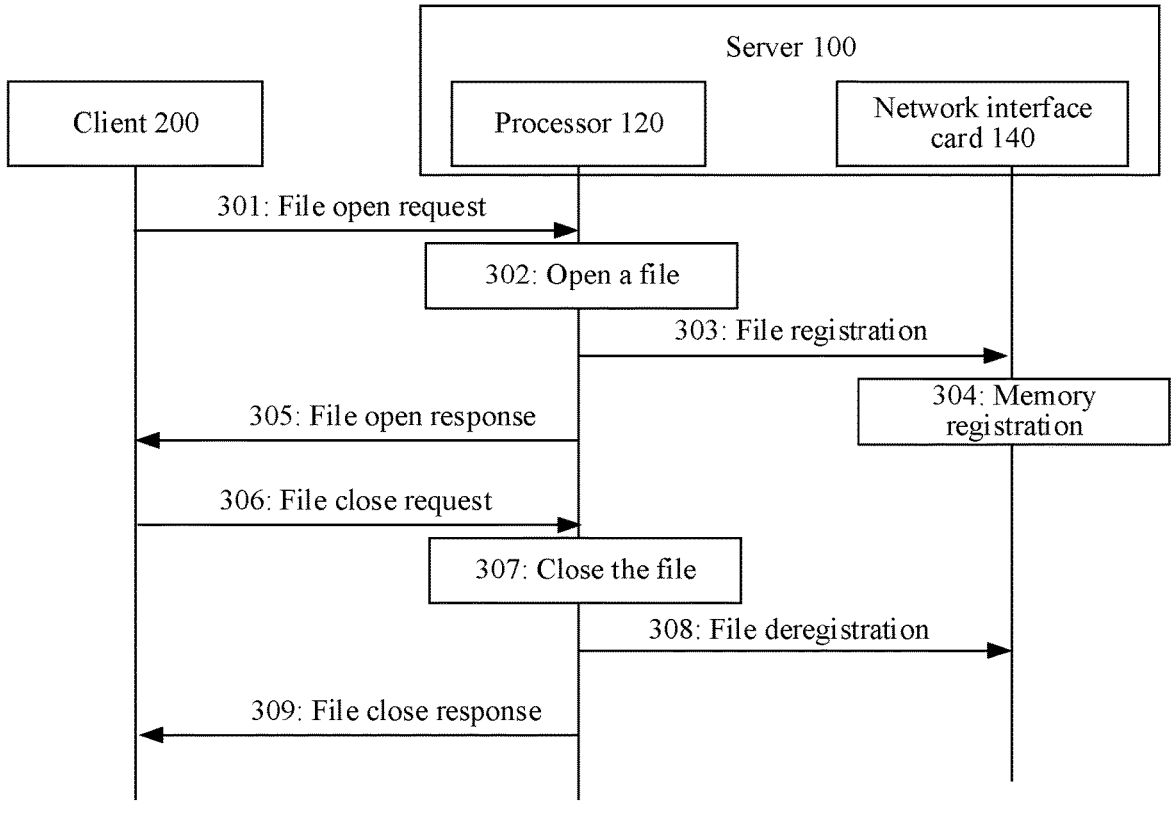
FIG. 3 is a schematic diagram of a file open and close method according to this application.
FIG. 4 is a schematic diagram of a data table according to this application.

The processor 120 may invoke computer-executable instructions stored in the memory 130 such that the server 100 can perform an operation performed by the processor 120 of the server 100 in an embodiment shown in FIG. 3.

Although not shown, a secondary memory may be further included in the server 100, where the secondary memory may also be referred to as an external memory. The external memory may be a non-volatile memory, for example, a read-only memory (ROM), a hard disk drive (HDD), or a solid-state drive (SSD). The external memory may be configured to store a file permanently.

In embodiments of this application, the processor 120 may transfer the file from the external memory to the memory 130, and may allocate, in the memory 130, a storage area to the file. The allocated storage area may store the file. When the file needs to be opened, the processor 120 may determine the storage area of the file in the memory 130, and notify the storage area of the file to the network interface card 140. If the file that needs to be opened is not transferred to the memory 130 in advance, when receiving a file open request, the processor 120 may allocate, in the memory 130, the storage area to the file to store the file, and notify the network interface card 140 of the storage area allocated to the file.

When the file needs to be closed, the processor 120 may deregister the storage area of the file, and delete the file stored in the memory 130.

In embodiments of this application, the network interface card 140 can perform not only data transmission (for example, receiving a file open/close request or a file access request and sending a file open/close response or a file access response) but also file read and write.

The network interface card 140 includes a processor 141 and an interface 142. For a specific form of the processor 141, refer to the processor 120 and the related descriptions. Details are not described herein again. The processor 141 enables the network interface card 140 of the server 100 to perform an operation performed by the network interface card 140 of the server 100 in an embodiment shown in FIG. 3, FIG. 5, FIG. 8, FIG. 9, or FIG. 11. The processor 141 may further send or receive information through the interface 142, for example, receive the file open request, the file access request, or the file close request, or send the file open response, the file access response, or the file close response.

In a conventional file read and write process, if a file is not registered with a network interface card, the network interface card cannot directly perform file read and write. Therefore, during the file read and write, a client needs to first obtain a file index from a server, and then determines a storage location of data in the file based on the file index. A network interface card on a server side is indicated by the client (where for example, the client initiates a one-sided RDMA operation) to read data from or write data into the storage location indicated by the client. This manner needs multiple interactions between the client and the server.

Alternatively, during the file read and write, a processor on the server side needs to obtain file data as indicated by the client, and sends the file data through the network interface card. This manner needs participation of the processor and is poor in efficiency.

In embodiments of this application, before the client 200 interacts with the server 100 to perform read or write on the file stored in the server 100, the processor 120 of the server 100 may first register the file with the network interface card 140, and notify the storage area of the file to the network interface card 140, to trigger the network interface card 140 to perform the memory registration operation. The network interface card 140 of the server 100 allocates the file identifier to the file, and feeds back the file identifier to the client 200.

After receiving the file access request that carries the file identifier from the client 200, the network interface card 140 of the server 100 accesses the file based on the file identifier, and performs file read or write. This manner in embodiments of this application does not need multiple interactions between the client 200 and the server 100 or participation of the processor 120 of the server 100 during the file access such that file access efficiency can be effectively improved.

A file access method provided in embodiments of this application may be divided into two procedures: a file registration and memory registration procedure and a file access procedure. The file access procedure may be further classified into a file read procedure and a file write procedure. Descriptions are separately provided below.

1. File Registration and Memory Registration Procedure

In the file registration and memory registration procedure, the processor 120 of the server 100 may notify a storage area of a file to the network interface card 140 of the server 100, and trigger the network interface card 140 to perform a memory registration operation such that the network interface card 140 allocates a file identifier to the file. In this way, when the client 200 intends to perform an operation, for example, read or write, on the file, the client 200 may include the file identifier in a request, to identify the file on which the read/write operation needs to be performed. Because the network interface card 140 has obtained the storage area of the file and performed the memory registration operation, the network interface card 140 may read data from or write data into the storage area of the file based on the file identifier.

Refer to FIG. 3. A file registration method provided in an embodiment of this application is described by using an example in which the network interface card 140 of the server 100 allocates a file identifier to a file. The method includes the following steps.

Step 301: A user initiates a file open request to the server 100 through the client 200.

The user may click the file in an interface provided by the client 200. After detecting the operation of the user, the client 200 determines that the user needs to open the file, and initiates the file open request to the server 100. The file open request carries a name of the file, and the name of the file may be allocated by the user to the file, and is stored in the server 100 when the server 100 stores the file.

In step 301, the network interface card 210 of the client 200 may send the file open request to the network interface card 140 of the server 100 according to RDMA. To be specific, the file open request is added as a WQE in a WQ to an SQ on a side of the client 200, where the WQE indicates that the file needs to be opened.

Step 302: After receiving the file open request, the network interface card 140 of the server 100 sends the file open request to the processor 120 of the server 100, and the processor 120 of the server 100 opens the file.

The network interface card 140 of the server 100 may obtain the file open request from an RQ on a side of the server 100, and send the file open request to the processor 120 of the server 100. The processor 120 of the server 100 may open the file based on the file open request, and determine a storage area of the file.

It should be noted that as data is written into the file, data volumes of data in the file and a file log become larger. Therefore, a data storage area of the file may be allocated on demand based on a volume of data that can be accommodated by the file. As the data is written, the processor 120 of the server 100 may expand the data storage area of the file. When expanding the data storage area of the file, the processor 120 of the server 100 may further notify an expanded data storage area of the file to the network interface card 140. A log storage area of the file is in a similar case.

It should be noted that, if the file that the user needs to open is a file not stored in the memory 130 of the server 100, the user may also initiate the file open request to the server 100 through the client 200. In this scenario, the processor 120 of the server 100 determines, based on the name that is of the file and that is carried in the file open request, that the file is not currently stored in the memory 130, and may allocate, in the memory 130, the storage area to the file.

Step 303: The processor 120 of the server 100 registers the file with the network interface card 140 of the server 100, and notifies the storage area of the file to the network interface card 140.

After determining or allocating the storage area of the file, the processor 120 of the server 100 may register the file with the network interface card 140 of the server 100. In other words, the processor 120 of the server 100 may notify the storage area of the file to the network interface card 140 such that the network interface card 140 obtains the storage area of the file. Further, the processor 120 of the server 100 may send, to the network interface card 140, information describing the storage area of the file (which is referred to as information about the storage area of the file for short herein), and trigger the network interface card 140 to perform a memory registration operation and allocate the file identifier to the file. The network interface card 140 may store the information about the storage area of the file and the file identifier.

It can be learned from the foregoing descriptions that the storage area of the file includes an index storage area of the file, the data storage area of the file, an information storage area of the file, and the log storage area of the file.

The information about the storage area of the file includes information about the index storage area of the file, information about the data storage area of the file, information about the information storage area of the file, and information about the log storage area of the file.

The information about the index storage area of the file is used as an example for description. The information about the index storage area of the file describes the index storage area of the file. There is a plurality of manners of describing the index storage area of the file. Correspondingly, there is also a plurality of types of information about the index storage area of the file. For example, the information about the index storage area of the file may include a start storage address of a file index and an end storage address of the file index. The information about the index storage area of the file may include a start storage address of a file index and a size of the file index.

Step 304: After obtaining the storage area of the file, the network interface card 140 of the server 100 performs the memory registration operation for storage area of the file, and allocates the file identifier to the file.

When performing the memory registration operation for the storage area of the file, the network interface card 140 of the server 100 may add the storage area of the file to an RDMA memory region. This ensures that the network interface card 140 can perform an operation on the storage area of the file. For example, the network interface card 140 reads the file index and the data in the file that are in the storage area of the file, and updates file information or the file log. For another example, the network interface card 140 writes data into the storage area of the file, and updates the file index, file information, or the file log.

The network interface card 140 of the server 100 may further record the information about the storage area of the file and the file identifier.

For example, the information about the storage area of the file and the file identifier that are stored in the network interface card 140 of the server 100 may be a data table shown in FIG. 4. The data table lists an example including the information about the index storage area of the file, the information about the log storage area of the file, the information about the information storage area of the file, and the file identifier.

The information about the information storage area of the file may be a file information address.

The information about the index storage area of the file includes an index address and an index size. The index address indicates the start storage address of the file index. The index size indicates a size of the file index.

The information about the log storage area of the file includes a part or all of a log key, a log address, a log size, or a log offset. The log size indicates a size of the log.

It can be learned from a role of the file index that the file index can indicate a storage location that is of the data in the file and that is in the data storage area of the file. After the processor 120 of the server 100 registers the file with the network interface card 140 of the server 100, the network interface card 140 learns of the data storage area of the file, the log storage area of the file, the information storage area of the file, and the index storage area of the file. The network interface card 140 may determine, based on the data table shown in FIG. 4, the file index corresponding to the file identifier, and determine the data in the file based on the file index.

Step 305: The processor 120 of the server 100 sends a file open response to the client 200 through the network interface card 140 of the server 100, where the file open response carries the file identifier.

The network interface card 140 of the server 100 may send the file open response to the client 200 according to RDMA. To be specific, the file open response is added as a WQE in a WQ to an SQ on the side of the server 100, where the WQE indicates that the file is opened.

The network interface card 210 of the client 200 may obtain the file open response from an RQ on the side of the client 200, and obtain the file identifier from the file open response.

Through step 301 to step 305, the client 200 may send the file open request to trigger the side of the server 100 to register the file with the network interface card 140.

Correspondingly, when closing the file through the client 200, the user may trigger, through the client 200, the server 100 to deregister the file from the network interface card 140. For details, refer to step 306 to step 309.

Step 306: The user initiates a file close request to the server 100 through the client 200.

The user may select a "file close" option in an interface provided by the client 200. After detecting the operation of the user, the client 200 determines that the user needs to close the file, and initiates the file close request to the server 100. The file close request carries the file identifier.

The network interface card 210 of the client 200 may send the file close request to the server 100 according to RDMA. A manner in which the client 200 sends the file close request to the server 100 according to RDMA is similar to the manner in which the network interface card 210 of the client 200 sends the file open request to the server 100 according to RDMA. For details, refer to the foregoing descriptions. Details are not described herein again.

Step 307: After receiving the file close request, the processor 120 of the server 100 closes the file, for example, may release a resource occupied by the file.

Step 308: The processor 120 of the server 100 deregisters the file from the network interface card 140 of the server 100.

The processor 120 of the server 100 may deregister the storage area of the file from the network interface card 140 of the server 100, for example, notify the network interface card 140 to delete the information about the log storage area of the file, the information about the information storage area of the file, the information about the data storage area of the file, and the file identifier.

Step 309: After closing the file, the processor 120 of the server 100 may send a file close response to the client 200 through the network interface card 140 of the server 100.

The network interface card 140 of the server 100 may send the file close response to the client 200 according to RDMA. A manner in which the network interface card 140 of the server 100 sends the file close response to the client 200 according to RDMA is similar to the manner in which the network interface card 140 of the server 100 sends the file open response to the client 200 according to RDMA. For details, refer to the foregoing content. Details are not described herein again.

It should be noted that in FIG. 3, only an example in which the processor 120 of the server 100 registers the file with the network interface card 140 of the server 100 in the scenario in which the client 200 initiates the file open request is used for description. In actual application, embodiments of this application are not limited to a scenario in which the processor 120 of the server 100 registers the file with the network interface card 140 of the server 100. For example, the scenario may be: When the file is stored in the server 100, the processor 120 of the server 100 registers the file with the network interface card 140 of the server.

2. File Access Procedure

Figure 5:
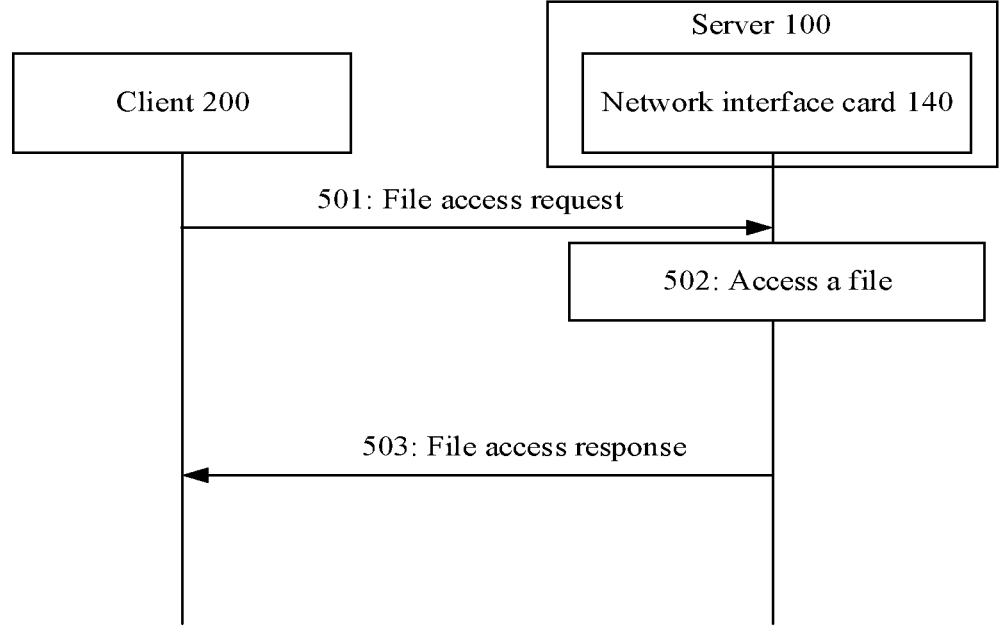
FIG. 5 is a schematic diagram of a file access method according to this application.

FIG. 5 shows a file access method according to an embodiment of this application. The method includes the following steps.

Step 501: A user initiates a file access request to the server 100 through the client 200. The file access request requests to access a file, and includes a file identifier.

The user may trigger, through a file system client deployed on the client 200, the network interface card 210 of the client 200 to initiate the file access request. The file system client may send the file access request that carries the file identifier to the network interface card 210 of the client 200, and indicate the network interface card 210 to initiate the file access request to the server 100. In this manner, the network interface card 210 of the client 200 may be unaware of information in the file access request.

Herein, the file access request may request to read first data in the file, in other words, the file access request is a file read request. The file access request may alternatively request to write second data into the file, in other words, the file access request is a file write request.

Step 502: The network interface card 140 of the server 100 receives the file access request from the client 200, and accesses the file based on the file identifier.

After receiving the file access request, the network interface card 140 of the server 100 may obtain the file identifier by parsing the file access request, determine a file index based on the file identifier, and further determine a storage location of data in the file.

If the file access request is the file read request, the network interface card 140 of the server 100 may read the first data from the file based on the file read request.

If the file access request is the file write request, the network interface card 140 of the server 100 may write the second data into the file based on the file write request.

Step 503: The network interface card 140 of the server 100 sends a file access response to the client 200.

If the file access request is the file read request, the file access response is a file read response, and the file read response includes the first data.

If the file access request is the file write request, the file access response is a file write response, and the file write response indicates that the second data is successfully written.

It can be learned from the foregoing that the file access procedure is classified into the file read procedure and the file write procedure. The following separately describes the file read procedure and the file write procedure.

(1) File Read Procedure

After a file is registered with the network interface card 140 of the server 100, a user may read data in the file from the server 100 through the client 200.

Figure 6:
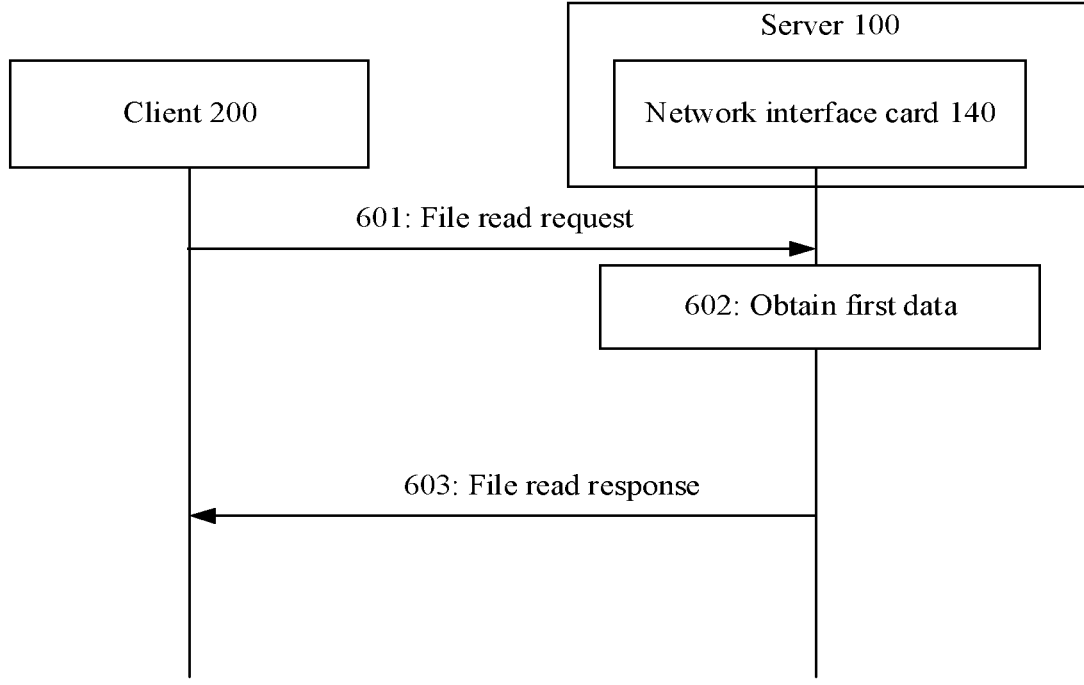
FIG. 6 is a schematic diagram of a file read method according to this application.

FIG. 6 shows a file read method according to an embodiment of this application. The method includes the following steps.

Step 601: A user initiates a file read request to the server 100 through the client 200 (for example, the network interface card 210 of the client 200), where the file read request requests to read first data in the file, and the first data may be all or some of data in the file.

The user may select, from the file and in an interface provided by the client 200, the first data that needs to be read, for example, click a "read" option. After detecting the operation of the user, the client 200 determines that the user needs to read the first data in the file, and initiates the file read request to the server 100. The file read request carries a file identifier and related information of the first data. The related information of the first data may include a data length of the first data, an offset of the first data in the data in the file (for example, indicating offsets of the first bit in the first data and the first bit in the data in the file), and the like.

In embodiments of this application, a data packet header of the file read request may carry the related information of the first data, and may further indicate a type of the file read request.

Figures 7, 8:
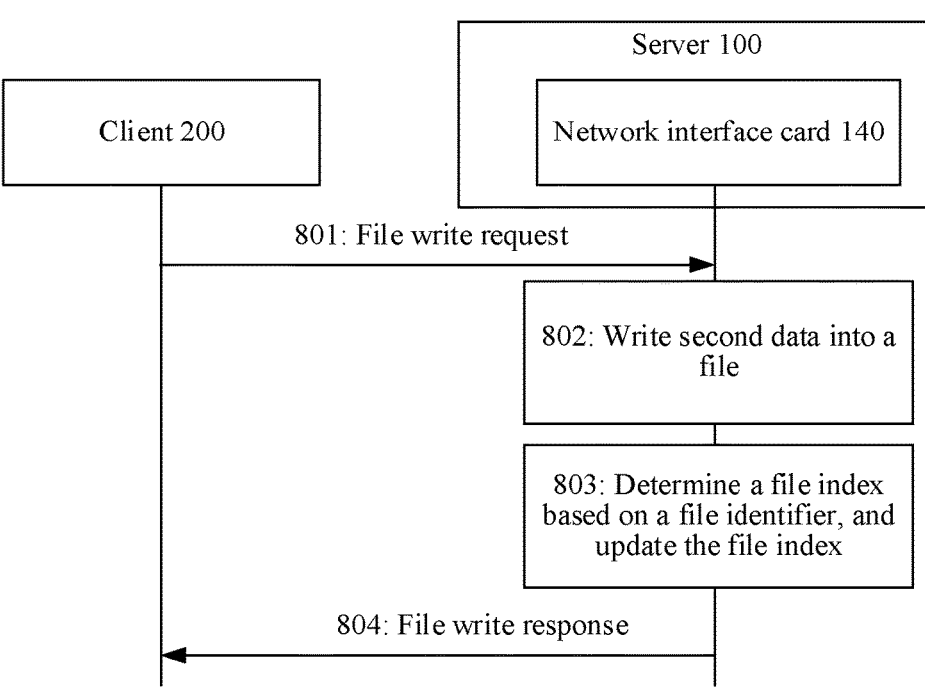
FIG. 7 is a schematic diagram of a structure of a data packet header according to this application.
FIG. 8 is a schematic diagram of a file write method according to this application.

For example, FIG. 7 shows a format of the data packet header of the file read request according to an embodiment of this application. As shown in FIG. 7, the data packet header includes a file operation code (OP), the file identifier, the data length of the first data, and the offset of the first data in the data in the file. In the file read request, the OP may be read, indicating that the request is the file read request and requesting to read the first data in the file.

Optionally, the data packet header may further include a page index, and the page index indicates a page that is on a side of the server 100 and that stores the first data (where the page is in a data storage area of the file). The page index may be determined through calculation by the client 200 based on the offset and a size of the page. Usually, a size of a page is fixed, for example, is four kilobytes (kB). The page for the first data may be determined by using a ratio of the offset to the size of the page, to determine the page index.

In some scenarios, the data packet header may not carry the page index, and the network interface card 140 of the server 100 may calculate the page index based on the offset and the size of the page. In FIG. 7, the OP and the offset may occupy the zeroth to the third bytes, the page index may occupy the fourth to the seventh bytes, the file identifier may occupy the eighth to the eleventh bytes, and the length may occupy the twelfth to the fourteenth bytes. A quantity of bytes occupied by each piece of information in the data packet header and a location of each piece of information in the data packet header are not limited in embodiments of this application. FIG. 7 is merely an example.

It should be noted that the file read request may alternatively not carry the related information of the first data. For example, when all the data in the file needs to be read, the file read request may carry an indicator. The indicator may be a character predetermined by the client 200 and the server 100, and indicates that all the data in the file needs to be read.

Step 602: After receiving the file read request, the network interface card 140 of the server 100 obtains the first data. When the file read request arrives at the server 100, the file read request is first received by the network interface card 140 of the server 100. In step 602, the network interface card 140 of the server 100 may directly process the file read request, and parse the file read request.

When obtaining the first data, the network interface card 140 of the server 100 may determine an index storage area of the file based on the file identifier, and obtain a file index from the index storage area. After obtaining the file index, the network interface card 140 of the server 100 may determine a storage location of the data in the file based on the file index, and then read the first data from a storage location of the data in the file based on the related information of the first data, for example, the length of the first data and the offset of the first data in all the data in the file.

It should be noted that, before obtaining the first data, the network interface card 140 of the server 100 may further perform validity verification on the client 200 based on the file identifier. When performing memory registration for the file, the network interface card 140 of the server 100 generates a remote key and a local key for the file. The remote key may be sent to the client 200 as the file identifier, and the local key may be stored locally.

After receiving the file read request, the network interface card 140 of the server 100 may compare the file identifier with the locally stored local key. When the file identifier is consistent with the local key, the validity verification on the client 200 succeeds. Otherwise, the verification fails. The network interface card 140 of the server 100 may directly reject the file read request, or may transmit the file read request to the processor 120 of the server 100 such that the processor 120 of the server 100 processes the file read request.

Step 603: After obtaining the first data, the network interface card 140 of the server 100 may send a file read response to the client 200, where the file read response carries the first data in the file. In embodiments of this application, a format of the file read response may conform to a format that is of a file read response and that is defined in RDAM.

(2) File Write Procedure

A user may further add, through the client 200, new data to a file stored in the server 100, or replace, through the client 200, data in a file stored in the server 100, in other words, perform the file write procedure.

FIG. 8 shows a file write method according to an embodiment of this application. The method includes the following steps.

Step 801: A user initiates a file write request to the server 100 through the client 200, where the file write request requests to write second data into the file, and includes a file identifier and the second data. The user may send the file write request through the network interface card 210 of the client 200.

In embodiments of this application, a manner of writing the second data into the file may be appending the second data to data in the file, or may be replacing some or all of data in the file with the second data.

Step 802: After receiving the file write request, the network interface card 140 of the server 100 writes the second data into the file. When the file write request arrives at the server 100, the file write request is first received by the network interface card 140 of the server 100. In step 802, the network interface card 140 of the server 100 may directly process the file write request, to be specific, may parse the file write request.

When the file write request requests to append the second data to the file, the network interface card 140 of the server 100 applies for a new storage area in a data storage area of the file, and may write the second data into the storage area that is applied for.

When the file write request requests to replace some or all of the data in the file with the second data, the network interface card 140 of the server 100 may replace some or all of the data in a storage area of the data in the file with the second data (where this manner is replace in overwrite). Alternatively, the network interface card 140 of the server 100 may apply for a storage area in a data storage area of the file, and may write the second data into the storage area that is applied for (where this manner is a rewrite scenario in overwrite).

Step 803: The network interface card 140 of the server 100 updates a file index such that the file index can indicate a storage location of data in the file into which the second data is written.

When the file write request requests to append the second data to the file, the file index is updated such that the file index can indicate the storage location of the data in the file into which the second data is written.

When the file write request requests to replace some or all of the data in the file with the second data, in the rewrite scenario, because the storage location of the data in the file changes in the data storage area of the file, the network interface card 140 of the server 100 needs to update the file index. In the replace scenario, because the storage location of the data in the file does not change in the data storage area of the file, the network interface card 140 of the server 100 may not update the file index, in other words, does not need to perform step 803.

When the file write request requests to append the second data to the file, a file log may be further updated. The file log may record the appended second data and a storage location of the second data. The network interface card 140 of the server 100 may further update file information, and record information, such as a time point at which the second data is written, in the file information.

When the file write request requests to replace some or all of the data in the file with the second data, a file log may be further updated. The file log may record the written second data and a storage location of the second data. The network interface card 140 of the server 100 may further update file information, and record information, such as a time point at which the second data is written, in the file information.

It should be noted that, before writing the second data into the storage area, the network interface card 140 of the server 100 may further perform validity verification on the client 200 based on the file identifier. For a manner in which the network interface card 140 of the server 100 performs validity verification on the client 200 based on the file identifier, refer to the foregoing descriptions. Details are not described herein again.

Step 804: The network interface card 140 of the server 100 sends a file write response to the network interface card 210 of the client 200, to notify the client 200 that the second data is successfully written. In embodiments of this application, a format of the file write response may conform to a format that is of a file write response and that is defined in RDAM.

It can be learned from the foregoing that, in embodiments of this application, the file write procedure is classified into append and overwrite. The following separately describes the two file write procedures. To distinguish the file write requests sent in the two procedures, the file write request in the append procedure is referred to as a first file write request, and the corresponding file write response is referred to as a first file write response. The file write request in the overwrite procedure is referred to as a second file write request, and the corresponding file write response is referred to as a second file write response.

(1) Append

Figure 9:
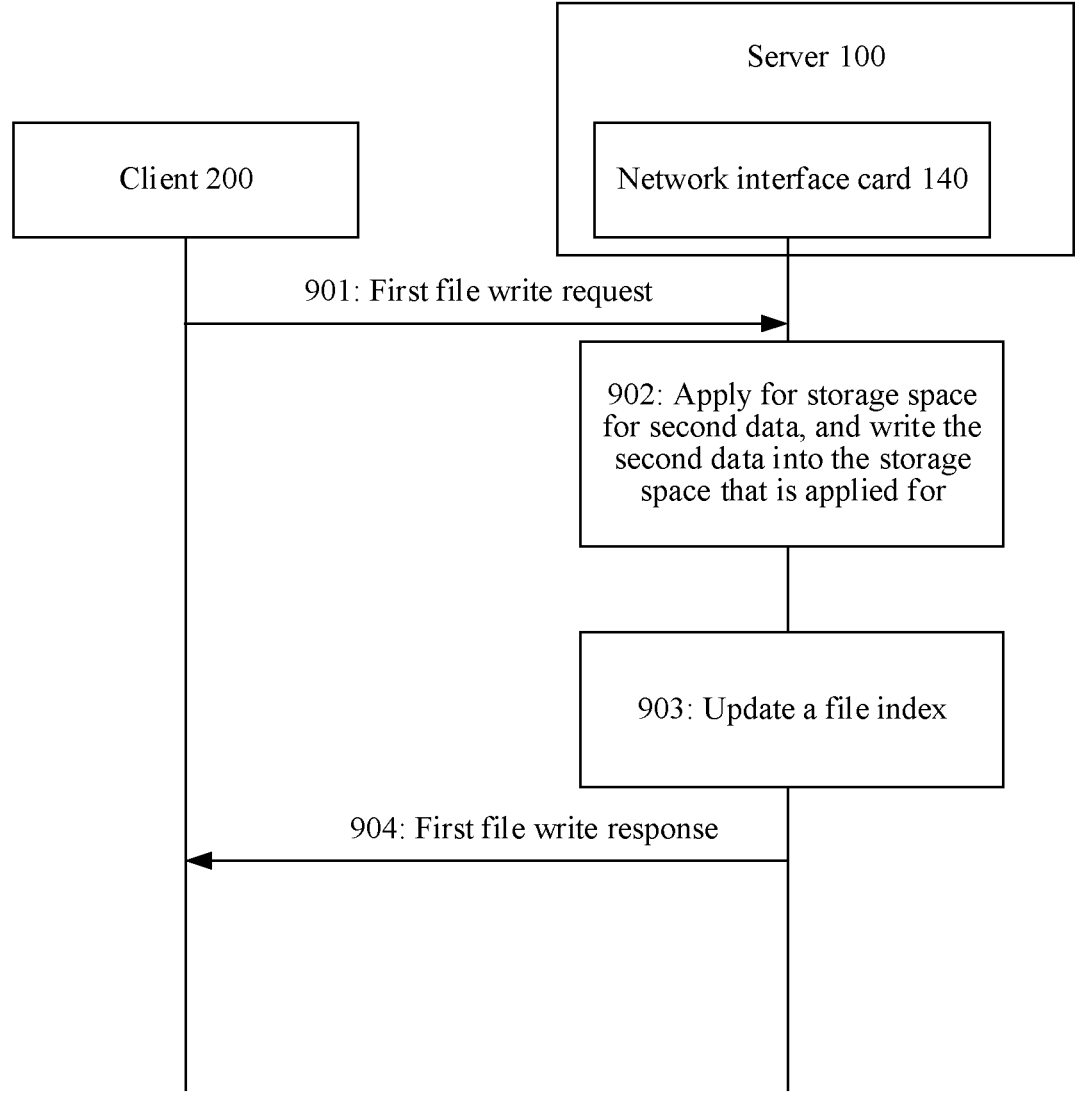
FIG. 9 is a schematic diagram of a file append method according to this application.

FIG. 9 is a schematic flowchart of file append according to an embodiment of this application. The method includes the following steps.

Step 901: A user initiates a first file write request to the network interface card 140 of the server 100 through the network interface card 210 of the client 200, where the first file write request requests to append second data to a file, and the second data may be second data that needs to be newly added to the file.

The user may input or select, in an interface provided by the client 200, the second data that needs to be added to the file, for example, input or select the second data that needs to be newly added to the file. After detecting the operation of the user, the client 200 determines that the user needs to write the second data into the file, and initiates the first file write request to the server 100. The first file write request carries a file identifier and the second data. Optionally, the first file write request may further carry related information of the second data, for example, a data length of the second data.

In embodiments of this application, a data packet body of the first file write request may carry the second data, and a data packet header of the first file write request may carry the related information of the second data (for example, the data length of the second data), and may further indicate a type of the file write request.

Figure 10:
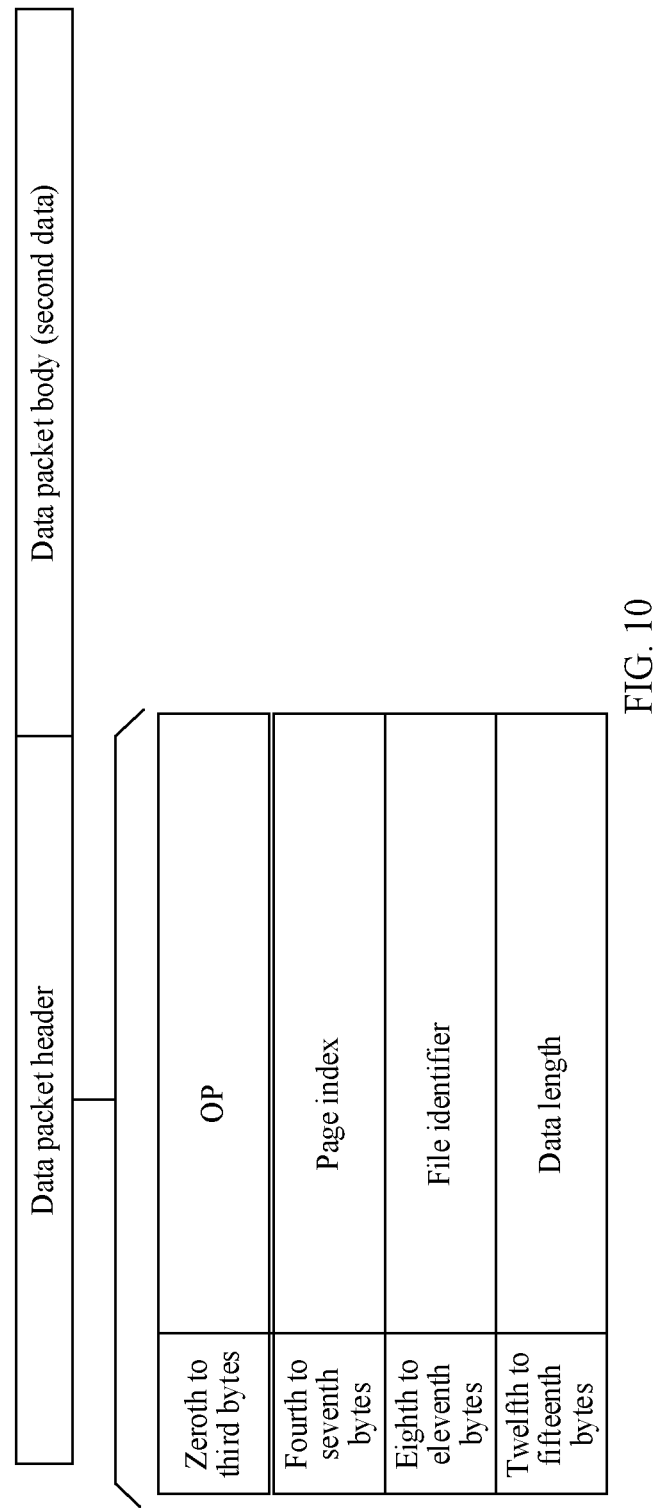
FIG. 10 is a schematic diagram of a structure of a data packet header according to this application.

For example, FIG. 10 shows a format of the first file write request according to an embodiment of this application. In FIG. 10, a data packet body of a first file write request may carry the second data, and a data packet header includes a file operation code (OP) and the file identifier. In the first file write request, the OP may be append, indicating that the request is a file write request and requesting to append the second data to the file.

The data packet header may further include the data length of the second data, an offset of the second data in all data of the file, and a page index. Because the second data needs to be appended to the file, the offset may be equal to a data length of all data in the current file. For a description of the page index, refer to the foregoing content. Details are not described herein again. A quantity of bytes occupied by each piece of information in the data packet header and a location of each piece of information in the data packet header are not limited in embodiments of this application. FIG. 10 is merely an example.

Step 902: After receiving the first file write request, the network interface card 140 of the server 100 may apply for a storage area for the second data in a data storage area of the file, and write the second data into the storage area that is applied for.

The first file write request requests to append the second data to the file, to be specific, the second data needs to be behind and next to the data already stored in the file. Therefore, the network interface card 140 of the server 100 applies for the storage area for the second data, and a size of the storage area is equal to the data length of the second data. To be specific, a start location (where the start location herein indicates a virtual address) of the storage area that is applied for is an end storage location of the data already stored in the file, in other words, the start location of the storage area that is applied for points to an end of the file.

Step 903: The network interface card 140 of the server 100 may update a file index, where an updated file index may indicate a storage location of the second data.

The network interface card 140 of the server 100 determines, based on a data table shown in FIG. 4, the file index corresponding to the file identifier, and then determines an index storage area of the file based on the file index, reads the file index, and updates the file index.

In addition to appending the second data and updating the file index, the network interface card 140 of the server 100 may further update file information and a file log. For a manner of updating the file information and the file log, refer to the related descriptions in the embodiment shown in FIG. 7. Details are not described herein again.

Step 904: After writing the second data, the network interface card 140 of the server 100 may send a first file write response to the network interface card 210 of the client 200, to notify the client 200 that the second data is successfully written.

(2) Overwrite

Figure 11:
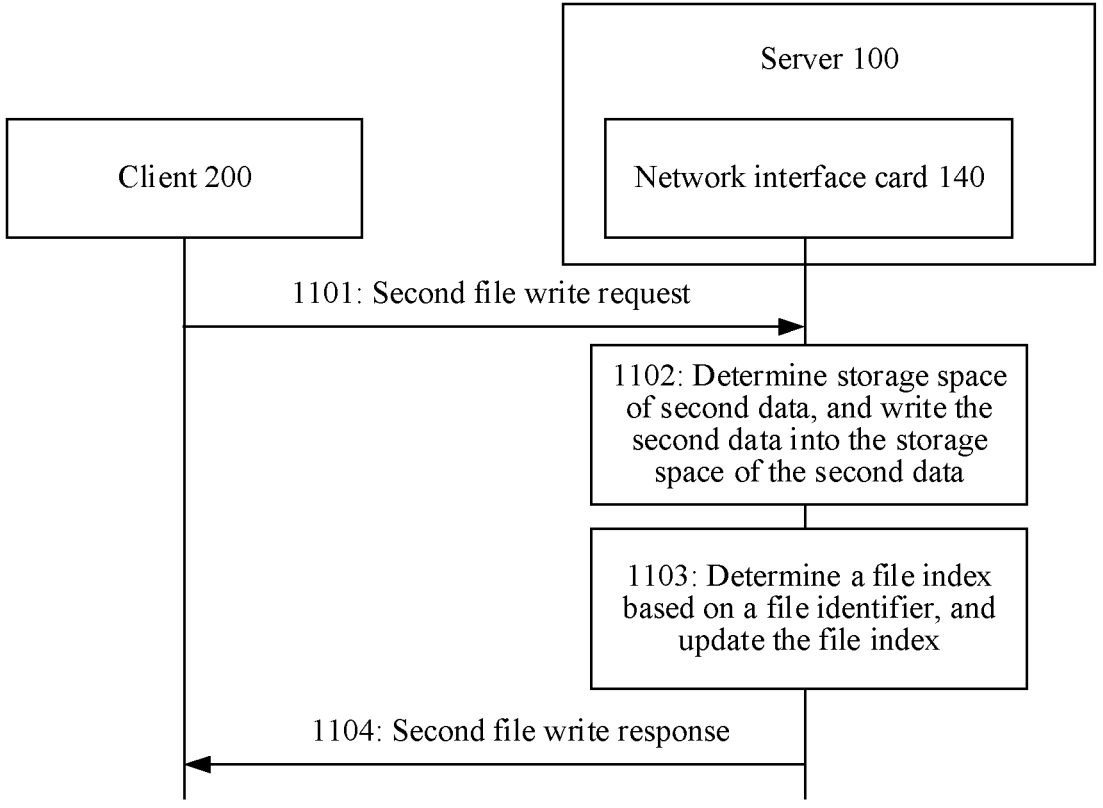
FIG. 11 is a schematic diagram of a file overwrite method according to this application.

FIG. 11 is a schematic flowchart of file overwrite according to an embodiment of this application. The method includes the following steps.

Step 1101: A user initiates a second file write request to the network interface card 140 of the server 100 through the network interface card 210 of the client 200, where the second file write request requests to replace data in a file with second data, and the second data may be data that needs to be written into in the file through replacement.

The user may input or select, in an interface provided by the client 200, the second data that needs to be written into the file, for example, input or select the second data that needs to be written into the file through replacement. After detecting the operation of the user, the client 200 determines that the user needs to write the second data into the file, and initiates the second file write request to the server 100. The second file write request carries a file identifier and the second data. Optionally, the second file write request may further carry related information of the second data, for example, a data length of the second data and an offset of the second data in data in the file.

In embodiments of this application, a data packet body of the second file write request may carry the second data, and a data packet header of the second file write request may carry the related information of the second data (for example, the data length of the second data and the offset of the second data in the data in the file), and may further indicate a type of the file write request.

Figure 12:
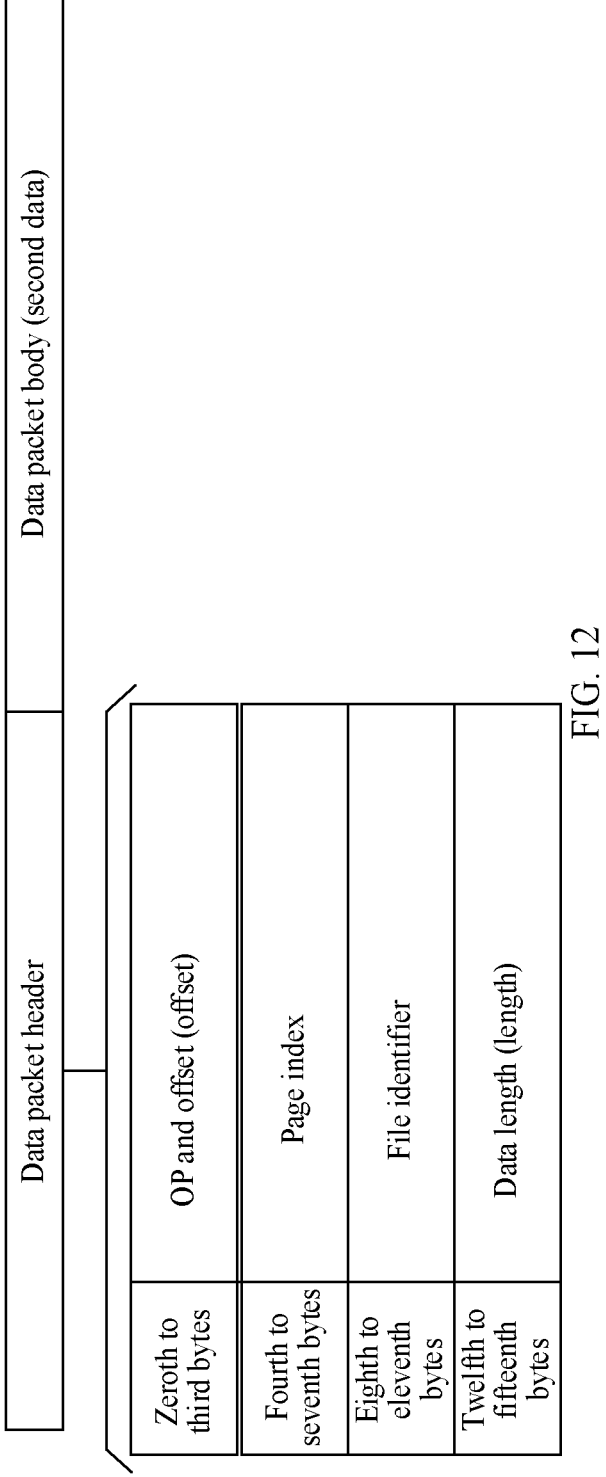
FIG. 12 is a schematic diagram of a structure of a data packet header according to this application.

For example, FIG. 12 shows a format of the second file write request according to an embodiment of this application. As shown in FIG. 12, a data packet body of the second file write request may carry the second data, and a data packet header includes a file OP, the file identifier, the data length of the second data, and the offset of the second data in all the data in the file. In the second file write request, the OP may be replace. In this scenario, the network interface card 140 of the server 100 needs to overwrite the data in the file, and write the second data. In the second file write request, the OP may be rewrite. In this scenario, the network interface card 140 of the server 100 may retain existing data in the file, and apply for a new storage area to write the second data. For the OP, replace and rewrite may both indicate that the request is a file write request, but corresponds to different manners of writing the second data.

Optionally, the data packet header may further include a page index. For a description of the page index, refer to the foregoing content. Details are not described herein again. A quantity of bytes occupied by each piece of information in the data packet header and a location of each piece of information in the data packet header are not limited in embodiments of this application. FIG. 12 is merely an example.

Step 1102: After receiving the second file write request, the network interface card 140 of the server 100 determines a storage area of the second data, and writes the second data into the storage area of the second data.

The storage area of the second data may be space of the data already stored in a data storage area of the file (where this corresponds to the scenario in which the OP is replace), or may be the storage area that is applied for, in a data storage area of the file, by the network interface card 140 of the server 100 for the second data (where this corresponds to the scenario in which the OP is rewrite).

When the OP is replace, the network interface card 140 of the server 100 determines, based on the related information of the second data, such as the data length of the second data and the offset of the second data in the data in the file, a storage area of data that needs to be replaced in the data storage area of the file. The storage area is the storage area of the second data, and the second data is written into the storage area.

When the OP is rewrite, the network interface card 140 of the server 100 may alternatively not overwrite the existing data in the file, in other words, retain the existing data in the file. The network interface card 140 of the server 100 may apply for the storage area for the second data in the data storage area (a blank area) of the file. A size of the storage area may be equal to a data size of the second data, and the second data is written into the storage area that is applied for. Different from the storage area in the append manner, the storage area applied for herein may not be next to an area of the stored data in the data storage area of the file, in other words, a start location of the storage area that is applied for may not point to an end of the file.

When the OP is replace, the network interface card 140 of the server 100 may not update a file index, in other words, does not need to perform step 1103. When the OP is rewrite, the network interface card 140 of the server 100 needs to update a file index, in other words, needs to perform step 1103.

Step 1103: The network interface card 140 of the server 100 determines the file index based on the file identifier, and updates the file index.

The network interface card 140 of the server 100 may determine an index storage area of the file based on the file identifier, read the file index from the index storage area of the file, determine, based on the data length of the second data and the offset of the second data in the data in the file, a part that is in the file index and that indicates a storage location of the data that needs to be replaced, and modify the part such that the part can indicate a storage location of the second data.

In addition to writing the second data and updating the file index, the network interface card 140 of the server 100 may further update file information and a file log of the file. For a manner of updating the file information and the file log of the file, refer to the related descriptions in the embodiment shown in FIG. 8. Details are not described herein again.

Step 1104: After writing the second data, the network interface card 140 of the server 100 may send a second file write response to the network interface card 210 of the client 200, to notify the client 200 that the second data is successfully written.

It should be noted that, in the foregoing embodiments, an example in which the file identifier is allocated by the network interface card 140 and may be for performing validity verification on the client 200 is used for description. In actual application, the file identifier may alternatively be allocated by the processor 120 of the server 100 to the file. When registering the file with the network interface card 140, the processor 120 of the server 100 may further notify the file identifier to the network interface card 140 of the server 100. In this case, when the network interface card 140 of the server 100 performs memory registration, the remote key allocated to the file may not be used as the file identifier, but is only for performing validity verification on the client 200. The file identifier and the remote key are carried in the file open response. In another possible scenario, the file identifier may be allocated by the network interface card 140 of the server 100 to the file, and is not the remote key. In other words, the network interface card 140 of the server 100 may allocate the file identifier and the remote key to the file. The file identifier and the remote key are carried in the file open response.

Figure 13:
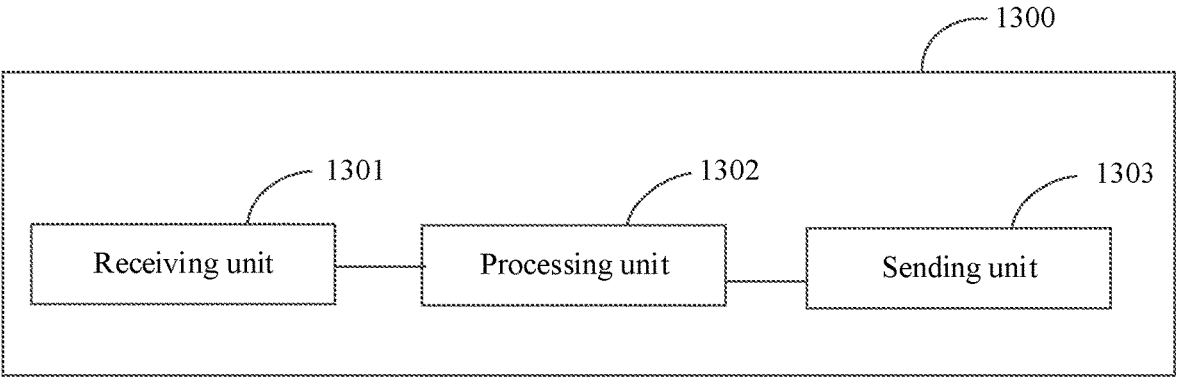
FIG. 13 is a schematic diagram of a structure of a file access apparatus according to this application.

Based on a same concept as the method embodiments, an embodiment of this application further provides a file access apparatus. The file access apparatus may be deployed on a network interface card, and is configured to perform the methods performed by the network interface card 140 in the foregoing method embodiments shown in FIG. 3, FIG. 5, FIG. 8, FIG. 9, and FIG. 11. For related features, refer to the foregoing method embodiments. Details are not described herein again. As shown in FIG. 13, the apparatus 1300 includes a receiving unit 1301, a processing unit 1302, and a sending unit 1303.

The receiving unit 1301 is configured to receive a file access request from a second device, where the file access request requests to access a file, and includes a file identifier of the file.

The processing unit 1302 is configured to access the file in a memory of the first device based on the file identifier.

The sending unit 1303 is configured to send a file access response to the second device.

In a possible implementation, before the receiving unit 1301 receives the file access request from the second device, the processing unit 1302 may obtain a storage area of the file from a processor of the device, perform a memory registration operation for the storage area of the file, and allocate the file identifier to the file. Then, the sending unit 1303 may send the file identifier to the second device.

In a possible implementation, the storage area of the file includes at least one of the following: a data storage area of the file, an index storage area of the file, an information storage area of the file, and a log storage area of the file.

In a possible implementation, the file access request requests to read first data in the file. When accessing the file based on the file identifier and sending the file access response to the second device, the processing unit 1302 may determine a file index of the file based on the file identifier, then obtain the first data based on the file index, and send the file access response to the second device, where the file access response includes the first data.

In a possible implementation, when determining the file index of the file based on the file identifier, the processing unit 1302 may determine the index storage area of the file based on the file identifier, and read the file index from the index storage area of the file.

In a possible implementation, the file index indicates a location that is of data in the file and that is in the data storage area of the file. When obtaining the first data based on the file index, the processing unit 1302 may obtain the first data from the data storage area of the file based on the file index.

In a possible implementation, the file access request requests to write second data into the file, and includes the second data. The processing unit 1302 may write the second data into the file when accessing the file based on the file identifier. The sending unit 1303 may send the file access response to the second device, where the file access response indicates that the second data is successfully written.

In a possible implementation, in addition to writing the second data, the processing unit 1302 may further determine a file index based on the file identifier, and update the file index, where an updated file index indicates a storage location of the second data.

In a possible implementation, there are a plurality of manners in which the file access request requests to write the second data into the file. The following separately describes the manners.

Manner 1: The file access request requests to append the second data to the file. In other words, a write mode is append.

When writing the second data into the file, the processing unit 1302 first applies for a first storage area, and writes the second data into the first storage area, where the first storage area is in the data storage area of the file, and a start location of the first storage area points to an end of the file, in other words, the written second data should be stored next to data already in the file.

Manner 2: The file access request requests to replace data in the file with the second data, and retain the original data. In other words, a write mode is rewrite.

When writing the second data into the file, the processing unit 1302 may first apply for a second storage area, and then write the second data into the second storage area. The second storage area is in the data storage area of the file.

Manner 3: The file access request requests to replace data in the file with the second data. In other words, a write mode is replace.

The file access request further includes a data length of the second data and an offset of the second data in data in the file. When writing the second data into the file, the processing unit 1302 may determine, from the data storage area of the file based on the data length of the second data and the offset of the second data in the data in the file, data that needs to be replaced, and overwrite, with the second data, the data that needs to be replaced.

In a possible implementation, when determining the file index based on the file identifier, and updating the file index, the processing unit 1302 may determine the index storage area of the file based on the file identifier, read the file index from the index storage area of the file, and update the file index.

Figure 14:
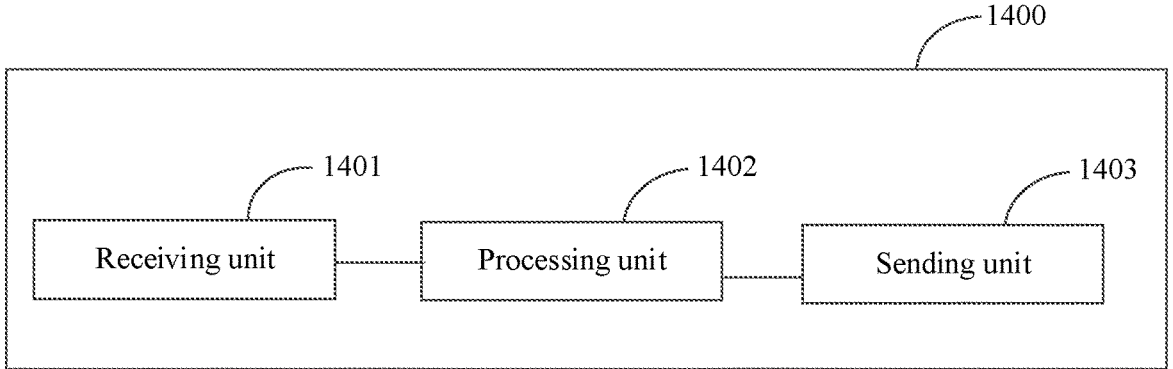
FIG. 14 is a schematic diagram of a structure of a file registration apparatus according to this application.

Based on the same concept as the method embodiments, an embodiment of this application further provides a file registration apparatus. The file registration apparatus is deployed on a processor, and is configured to perform the method performed by the processor 120 in the foregoing method embodiment shown in FIG. 3. For related features, refer to the foregoing method embodiment. Details are not described herein again. As shown in FIG. 14, the apparatus 1400 includes a processing unit 1402.

The processing unit 1402 is configured to determine a storage area of a file in a memory of a first device, and notify the storage area of the file to a network interface card of the first device.

In a possible implementation, the apparatus 1400 further includes a receiving unit 1401 and a sending unit 1403. Before the processing unit 1402 determines the storage area of the file in the memory of the first device, the receiving unit 1401 may receive a file open request from a second device. The file open request requests to open the file. The sending unit 1403 may send a file open response to the second device through the network interface card of the first device, where the file open response indicates that the file is successfully opened.

In a possible implementation, if the file is a file not stored in the memory of the first device, the processing unit 1402 may allocate the storage area to the file when determining the storage area of the file.

In a possible implementation, the storage area of the file includes at least one of the following: a data storage area of the file, an index storage area of the file, an information storage area of the file, and a log storage area of the file.

Based on the same concept as the method embodiments, an embodiment of this application further provides a storage node. The storage node is configured to perform the methods performed by the processor 120 and the network interface card 140 of the server 100 in the method embodiments shown in FIG. 3, FIG. 5, FIG. 8, FIG. 9, and FIG. 11. For related features, refer to the foregoing method embodiments. Details are not described herein again. It should be noted that, in embodiments of this application, division into the units is an example, and is merely logical function division. In actual implementation, another division manner may be used. Function units in embodiments of this application may be integrated into one processing unit, each of the units may exist alone physically, or two or more units may be integrated into one unit. The integrated unit may be implemented in a form of hardware, or may be implemented in a form of a software function unit.

All or some of the foregoing embodiments may be implemented by software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, the procedures or functions according to embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a Digital Versatile Disc (DVD)), or a semiconductor medium. The semiconductor medium may be a solid-state drive (SSD).

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a compact disc (CD)-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of processes and/or blocks in the flowcharts and/or the block diagrams. These computer program instructions may be provided for a general-purpose computer, a special-purpose computer, an embedded processor, or a processor of another programmable data processing device to generate a machine such that the instructions executed by the computer or the processor of the other programmable data processing device generate an apparatus for implementing a specific function in one or more processes in the flowcharts and/or in one or more blocks in the block diagrams.

These computer program instructions may be stored in a computer-readable memory that can instruct the computer or the other programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the other programmable data processing device such that a series of operations and steps are performed on the computer or the other programmable device, to generate computer-implemented processing. Therefore, the instructions executed on the computer or the other programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprises:
performing, by a network interface card of a first device, a memory registration operation for a storage area of a file, wherein the storage area of the file comprises an index storage area for storing a file index of the file and a data storage area for storing data in the file, and wherein the file index indicates a location that is of the data in the file and that is in the data storage area;
receiving, by the network interface card of the first device and from a second device, a first file access request that requests to read the data in the file and that comprises a file identifier of the file;
determining, by the network interface card of the first device and in response to receiving the first file access request, the index storage area based on the file identifier;
reading, by the network interface card of the first device, the file index directly from the index storage area;
obtaining, by the network interface card of the first device and based on the file index, the data from the data storage area; and
sending, by the network interface card of the first device, a first file access response to the second device in a single interaction and without participation of a processor of the first device in accessing the file, and wherein the first file access response comprises the first data.

2. The method of claim 1, further comprising sending, by the network interface card of the first device and to the second device, the file identifier, wherein the file identifier is allocated by the network interface card or the processor of the first device to the file.

3. The method of claim 1, wherein the storage area further comprises an information storage area of the file or a log storage area of the file.

4. The method of claim 1, wherein obtaining the data comprises:
obtaining, by the network interface card of the first device and based on the file index, a location that is of the data in the data storage area; and
obtaining, by the network interface card of the first device and based on the location that is of the data in the data storage area, the data from the data storage area.

5. The method of claim 1, further comprising:
receiving, by the network interface card of the first device and from the second device, a second file access request that requests to write second data into the file and further comprises the second data, wherein the second file access request comprises the file identifier of the file;
writing, by the network interface card of the first device, the second data into the file; and sending, by the network interface card of the first device and to the second device, a second file access response, wherein the second file access response indicates that the second data is successfully written.

6. The method of claim 5, further comprising:

determining, by the network interface card of the first device, the file index based on the file identifier; and updating, by the network interface card of the first device, the file index to obtain an updated file index indicating a storage location of the second data.

7. The method of claim 5, wherein writing the second data comprises:

applying, by the network interface card of the first device, for a first storage area located in the data storage area and comprising a start location that points to an end of the file; and writing, by the network interface card of the first device, the second data into the first storage area.

8. The method of claim 5, wherein writing the second data comprises:

applying, by the network interface card of the first device, for a second storage area; and writing, by the network interface card of the first device, the second data into the second storage area, wherein the second storage area is in the data storage area.

9. The method of claim 5, wherein the second file access request further comprises a data length of the second data and an offset of the second data in data in the file, and wherein writing the second data comprises:

determining, by the network interface card of the first device, from the data storage area, and based on the data length and the offset, third data that needs to be replaced; and overwriting, by the network interface card of the first device and with the second data, the third data that needs to be replaced.

10. The method of claim 1, further comprising obtaining, by the network interface card of the first device and from the processor of the first device, the storage area of the file, wherein the storage area of the file is in a memory of the first device.

11. The method of claim 1, further comprising parsing, by the network interface card of the first device, the first file access request to obtain the file identifier.

12. The method of claim 1, wherein the first file access request further comprises information of the first data, and wherein the information comprises a data length of the first data or an offset of the first data.

13. The method of claim 1, further comprising:

retrieving a remote key associated with the file using the file identifier; and validating the first file access request by verifying the remote key that ensures the second device has authorization to access the file.

14. A storage node, comprising:

a processor;

a memory configured to store a file; and a network interface card coupled to the memory and configured to:

perform a memory registration operation for a storage area of a file, wherein the storage area of the file comprises an index storage area for storing a file index of the file and a data storage area for storing data in the file, wherein the file index indicates a location that is of data in the file and that is in the data storage area;

receive a first file access request from a client, wherein the first file access request requests to read data in a file, and comprises a file identifier of the file;

in response to receiving the first file access request, determine, based on the file identifier, the index storage area;

read the file index directly from the index storage area;

obtain, based on the file index, the data from the data storage area; and send a first file access response to the client in a single interaction and without participation of a processor of the first device in accessing the file, wherein the first file access response comprises the first data.

15. The storage node of claim 14, wherein the processor is configured to:

receive, from the client, a file open request requesting to open the file;

open the file based on the file open request;

determine the storage area of the file in the memory; and notify the storage area to the network interface card, wherein the network interface card is further configured to send, to the client, a file open response comprising the file identifier, and wherein the file identifier is allocated by the network interface card or the processor to the file.

16. The storage node of claim 14, wherein the storage area further comprises an information storage area of the file or a log storage area of the file.

17. The storage node of claim 14, wherein the network interface card is further configured to:

obtain, based on the file index, a location that is of the data in the data storage area; and obtain, based on the location that is of the data in the data storage area, the data from the data storage area.

18. The storage node of claim 14, wherein the network interface card is further configured to:

receive, from the client, a second file access request that requests to write second data into the file and further comprises the second data, wherein the second file access request comprises the file identifier of the file;

write the second data into the file; and feed back a second file access response to the client, wherein the second file access response indicates that the second data is successfully written.

19. The storage node of claim 18, wherein the network interface card is further configured to:

determine the file index based on the file identifier; and update the file index to obtain an updated file index indicating a storage location of the second data.

20. The storage node of claim 14, wherein the network interface card is further configured to:

retrieve a remote key associated with the file using the file identifier; and validate the first file access request by verifying the remote key that ensures the second device has authorization to access the file.

* * * * *